UNITED STATES PATENT OFFICE.

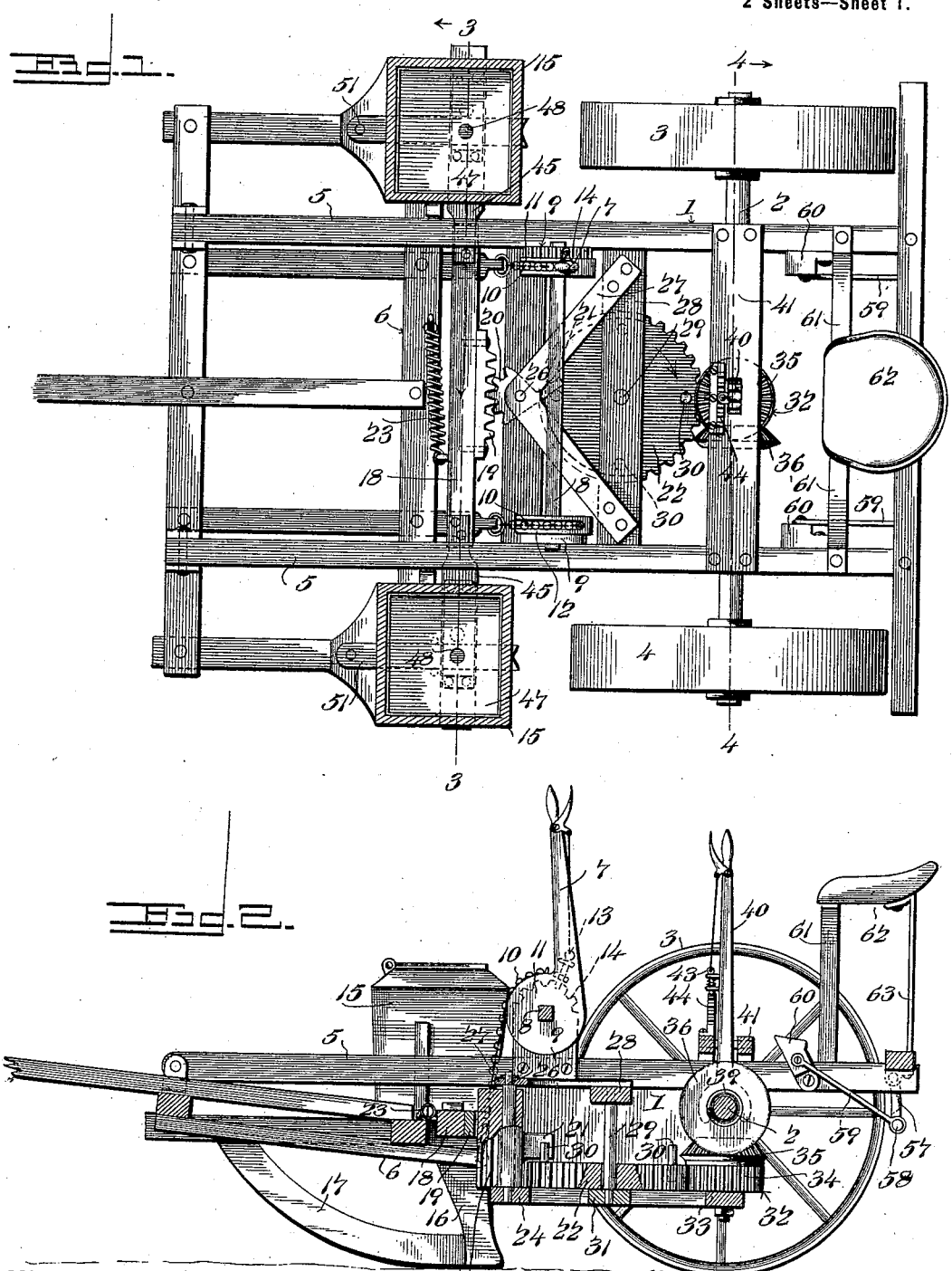

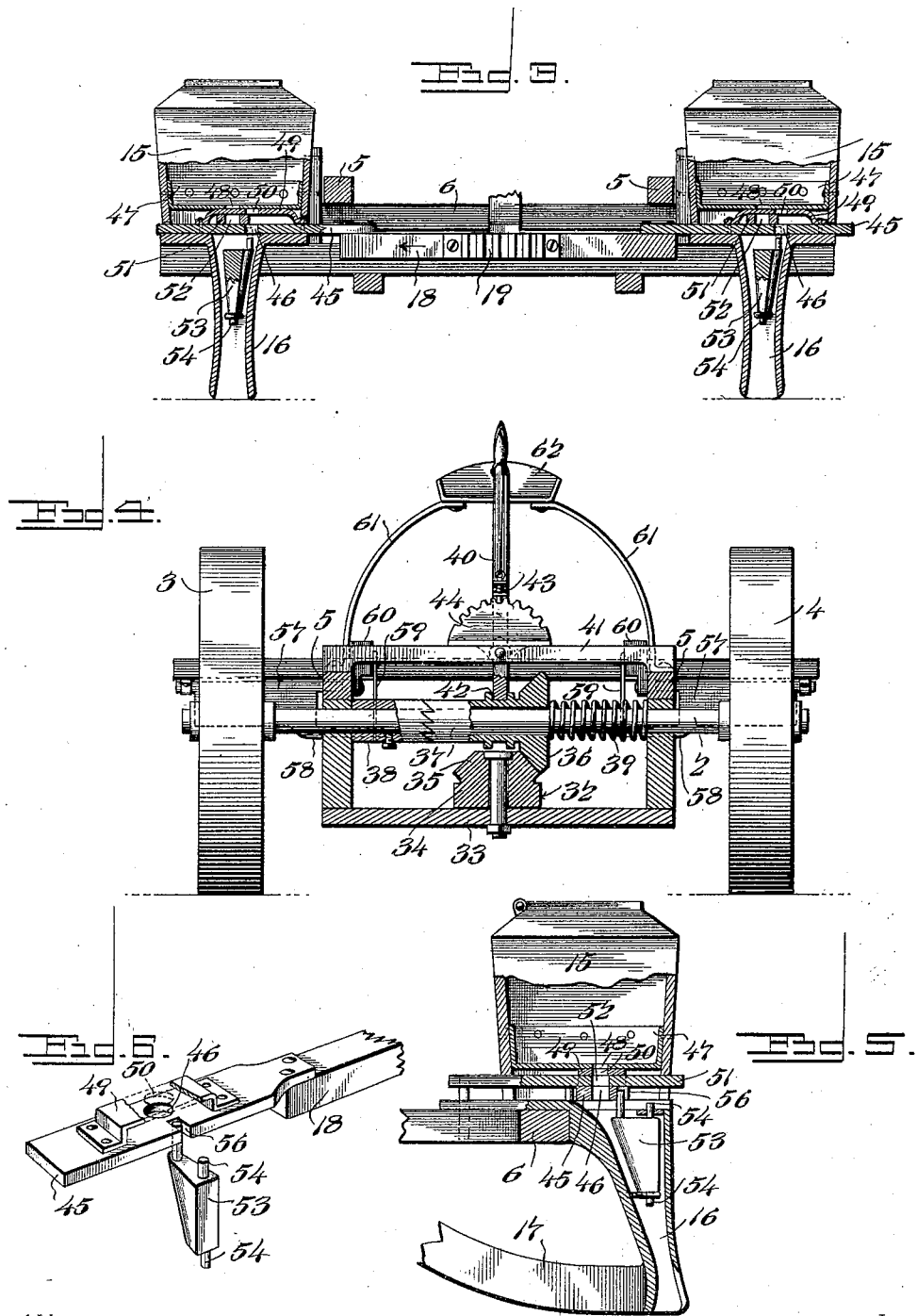

THOMAS FRIETCHEK, OF DODGE, NEBRASKA.

CORN-PLANTER.

SPECIFICATION forming part of Letters Patent No. 620,237, dated February 28, 1899.

Application filed November 21, 1898. Serial No. 697,044. (No model.)

*To all whom it may concern:*

Be it known that I, THOMAS FRIETCHEK, formerly a subject of the Emperor of Austria-Hungary, (but having declared my intention to become a citizen of the United States,) residing at Dodge, in the county of Dodge and State of Nebraska, have invented a new and useful Corn-Planter, of which the following is a specification.

The invention relates to improvements in corn-planters.

The object of the present invention is to improve the construction of corn-planters, more especially the mechanism for dropping the seed, and to provide simple, inexpensive, and efficient means capable of automatically dropping seed simultaneously at both sides at regular intervals, so that corn may be planted in perfect squares, whereby the necessity of employing marking devices will be obviated.

The invention consists in the construction and novel combination and arrangement of parts, as hereinafter fully described, illustrated in the accompanying drawings, and pointed out in the claims hereto appended.

In the drawings, Figure 1 is a plan view of a corn-planter constructed in accordance with this invention. Fig. 2 is a longitudinal sectional view. Figs. 3 and 4 are transverse sectional views on the lines 3 3 and 4 4 of Fig. 1. Fig. 5 is a detail sectional view taken longitudinally of one of the seed boxes or hoppers and its seed-tube. Fig. 6 is a detail perspective view of one end of the reciprocating feed-slide, illustrating the manner of connecting the same with the adjacent agitator.

Like numerals of reference designate corresponding parts in all the figures of the drawings.

1 designates a rear or main frame provided with suitable bearings receiving an axle 2, having ground-wheels 3 and 4 on its spindles, one of the wheels being fast and the other loose. The side beams 5 of the rear or main frame are extended forward and have a front or hopper-carrying frame 6 hinged to their front ends and adapted to be raised and lowered by means of a lever 7. The lever 7 is fixed to a transverse shaft journaled in suitable bearings 9 at opposite sides of the rear or main frame and connected with the rear portion of the front or hopper-carrying frame by chains 10 or other suitable flexible connections. The lever is provided at its lower end with a head 11, which is grooved to receive the upper portion of the adjacent chain 10 and which is located at one end of the shaft 8. The other end of the shaft is provided with a grooved block or wheel 12, receiving the upper portion of the other chain 11. The head of the lever 7 and the block 12 form arms for the shaft 8, which is adapted to be rocked by the lever to raise and lower the front or hopper-carrying frame 6. The front or hopper-carrying frame 6 is retained in an elevated position by a detent 13, mounted on the lever 7 and arranged to engage a ratchet 14, preferably consisting of teeth formed on the adjacent bearing 9; but any other suitable form of ratchet may be provided.

The rear end or portion of the frame 6 carries a pair of hoppers or seedboxes 15, located at opposite sides of the corn-planter and arranged over depending tubes 16, which are connected at their lower ends with the rear terminals of runners or furrow-openers 17. The discharge of seed from the hoppers is simultaneous and at regular intervals, so that the corn will be planted in squares, and this form of planter is designed for the purpose of dispensing with marking devices usually carried by corn-planters, the planter being designed to traverse a field in straight lines, suitable marks, such as stakes or the like, being designed to be provided at the ends of the rows for the purpose of enabling the driver to guide the planter, so that the rows will be straight.

The simultaneous dropping of the seed is effected by means of a reciprocating seed-slide 18, disposed transversely of the planter and having its ends guided in the hoppers, as hereinafter explained. The seed-slide is provided at its center with teeth 19, arranged at its rear edge and meshing with an oscillating horizontally-disposed segment 20, pivotally mounted in suitable supports and provided with a rearwardly-extending arm 21, arranged to be engaged by a tappet-wheel 22, whereby the seed-slide will be reciprocated in one direction. The return movement of the seed-slide is effected by means of a coiled spring 23, having one end attached to the slide and its other end connected to the front or hopper-carrying frame. The oscillating segment is mounted in a depending portion of the rear or main frame upon a transverse bar 24, and the top or upper end of the segment is provided with a pivot or journal 26, arranged in a bearing-opening of a substantially V-shaped bracket or brace 27, which extends forward from a cross-bar 28 and which has the said bearing-opening at its front or apex.

The tappet-wheel 22, which is horizontally disposed, is mounted on a vertical shaft or spindle 29 and is provided at its upper face with a series of tappets 30, arranged at regular intervals and adapted to engage the rearwardly-extending arm of the oscillating segment or sector 20. The shaft or spindle upon which the tappet-wheel is mounted is supported by the cross-bar 28, which is arranged at the upper end of the shaft, and the lower end of the latter is stepped upon a bottom cross-bar 31. The tappet-wheel is provided at its periphery with spur-teeth, which mesh with a pinion 32, supported upon a cross-bar 33, and provided with vertical spur-teeth 34 at its bottom and having bevel-teeth 35 at its upper portion to mesh with a vertically-disposed bevel-pinion 36 of the axle. Instead of providing the vertical teeth 34 and the bevel or inclined teeth 35 on the same pinion separate gears may be employed, if desired.

The bevel gear-wheel 36, which is mounted on the axle, is connected with the sliding clutch-section 37, which is adapted to interlock with a fixed clutch-section 38, which rotates with the axle, and when the clutch-sections are in engagement motion is communicated from the axle to the gearing which operates the seed-dropping mechanism. The sliding section is held in engagement with the fixed section or sleeve 38 by means of a coiled spring 39, disposed on the axle and engaging the adjacent face of the gear-wheel 36. The corn-planter is thrown into and out of operation by means of a lever 40, fulcrumed between its ends in an opening of a cross-bar 41 and having its lower end bifurcated and engaging a groove 42 of the sliding section of the clutch. The upper portion of the lever carries a detent 43, adapted to engage a ratchet 44, whereby the lever is locked at the desired adjustment.

The reciprocating slide 18, which is connected with the seed-dropping mechanism, is provided at its ends with arms 45, extending into the hoppers and provided with seed cups or openings 46, adapted to register with corresponding openings of the hoppers and capable of being reciprocated to arrange the openings out of register to cut off the discharge. Each hopper is provided with a false bottom of sheet metal or other suitable material, and this false bottom 47 has a discharge-opening 48. The arm 45 is provided at its upper face with a longitudinal plate 49, upwardly offset from the arm and having its terminals secured to the same, and the plate is provided with an opening 50. The opening 50 is disposed directly over the opening 46, and both are adapted to register with the opening 48 of the hopper. A longitudinal strip or piece 51, which is mounted on the hopper, extends through the opening or space between the plate 49 and the arm 45 and is provided with an opening or aperture 52, arranged directly beneath the discharge-opening 48. When the openings of the seed-dropping mechanism are in register, as illustrated in Fig. 5 of the accompanying drawings, the kernels are permitted to fall into the tube 16 and are dropped into the furrow made by the planter, and when the openings are arranged as shown in Fig. 3 the discharge of seed is cut off. This construction forms an efficient cut-off and the seed-dropping mechanism is supported and strengthened.

The sides of the hopper are provided with openings, through which the arms 45 project and which form guides for the same.

The corn discharged from the hoppers into the tubes 16 is prevented from clogging the same and remaining therein by agitators 53, arranged to vibrate horizontally and located in the upper portions of the tubes. Each agitator, which is provided at its top and bottom with pivots or journals 54, is mounted in suitable bearings or supports and is provided with a projection or pin extending upward from the front end of the agitator and arranged in a recess 56 of the arm 45. The pivots are located adjacent to the rear face of the agitator, and when the slide is reciprocated the agitators are vibrated.

After the corn has been dropped into the furrows it is covered by the ground-wheels, and the corn-planter is provided at its back with a pair of hinged scrapers 57, arranged to engage the wheels at the back thereof to remove any soil adhering to the same. The scrapers are hinged at their upper edges and are provided with depending inwardly-extending arms 58, connected by rods 59 with foot-levers 60, arranged to be operated by the feet of the driver and located in advance of the side standards 61 of a seat 62. The side standards 61 are located at the front edge of the seat, at opposite sides thereof, and the back of the seat is supported by a rear standard 63.

The invention has the following advantages: The corn-planter is adapted to drop seed in regular squares and is designed to dispense with seed-markers. The seed-dropping mechanism is simultaneously operated at regular intervals by the tappet-wheel and the gearing for connecting the same with the axle, and such gearing may be readily thrown into and out of operation. The corn is prevented from becoming clogged by the agitators, which are vibrated by the seed-dropping mechanism.

Changes in the form, proportion, and minor details of construction may be resorted to without departing from the spirit or sacrificing any of the advantages of this invention.

What is claimed is—

1. In a corn-planter, the combination of a frame, seed-dropping mechanism arranged at opposite sides thereof, a reciprocating bar connected with the seed-dropping mechanism and provided with teeth, a segment engaging the teeth and provided with a rearwardly-extending arm, a tappet-wheel arranged to vibrate the arm, and gearing for operating the tappet-wheel, substantially as described.

2. In a corn-planter, the combination of a frame, seed-dropping mechanism located at opposite sides of the frame, a reciprocating slide connected with the seed-dropping mechanism and provided with teeth, a segment meshing with the teeth and provided with an arm, a tappet-wheel arranged to engage the arm to actuate the slide in one direction, a spring connected with the slide to move the same in the opposite direction, and means for operating the tappet-wheel, substantially as described.

3. In a corn-planter, the combination of a frame, seed-dropping mechanism located at opposite sides of the frame, a reciprocating slide connected with the seed-dropping mechanism, a tappet-wheel provided with an annular series of tappets, and an oscillating device fulcrumed between its ends and having its front portion directly connected with and adapted to actuate the slide, the rear portion of the device being arranged in the path of the tappets, substantially as described.

4. In a corn-planter, the combination of a frame, seed-dropping mechanism arranged at opposite sides of the frame, a slide connected with the seed-dropping mechanism and provided with teeth, an oscillating segment meshing with the teeth of the slide and provided with a rearwardly-extending arm, a horizontal tappet-wheel provided with tappets arranged to engage the arm of the segment to actuate the slide in one direction, means for reciprocating the slide in the opposite direction, an axle, a clutch mounted on the axle, and gearing connecting the tappet-wheel with the axle and adapted to be thrown into and out of operation by the clutch, substantially as described.

5. In a corn-planter, the combination of a hopper, a tube, a vertically-disposed agitator arranged within the tube and provided at its top and bottom with pivots, and means for vibrating the agitator, substantially as described.

6. In a corn-planter, the combination of a hopper, a tube, a reciprocating slide having a recess, a vertically-disposed agitator provided at its top and bottom with pivots and arranged within the tube, said agitator being provided with an eccentrically-arranged pin fitting in the said recess, substantially as described.

7. In a corn-planter, the combination of a hopper having a false bottom provided with an opening, a tube, a reciprocating slide provided with a plate offset from its upper face and having an opening, said slide being provided with a recess and having an opening located opposite that of the plate, a longitudinal bar or piece interposed between the plate and the slide and provided with an opening located beneath that of the false bottom, and a vibrating agitator pivotally mounted within the tube and provided with a pin arranged in the recess of the slide, substantially as described.

In testimony that I claim the foregoing as my own I have hereto affixed my signature in the presence of two witnesses.

THOMAS FRIETCHEK.

Witnesses:
HERMAN HOLSTEN,
G. W. ROSA.